(12) United States Patent
Boraiah et al.

(10) Patent No.: US 12,017,523 B2
(45) Date of Patent: Jun. 25, 2024

(54) AERODYNAMIC FRONT CLOSING CROSS-MEMBER FOR ROAD VEHICLE

(71) Applicant: Volvo Truck Corporation, Gothenburg (SE)

(72) Inventors: Mahesh Boraiah, Greensboro, NC (US); Stephen Gelgot, Stokesdale, NC (US)

(73) Assignee: Volvo Truck Corporation, Gothenburg (SE)

( * ) Notice: Subject to any disclaimer, the term of this patent is extended or adjusted under 35 U.S.C. 154(b) by 205 days.

(21) Appl. No.: 17/598,579

(22) PCT Filed: Jun. 19, 2019

(86) PCT No.: PCT/US2019/037921
§ 371 (c)(1),
(2) Date: Sep. 27, 2021

(87) PCT Pub. No.: WO2020/256717
PCT Pub. Date: Dec. 24, 2020

(65) Prior Publication Data
US 2022/0176807 A1    Jun. 9, 2022

(51) Int. Cl.
*B60K 11/08* (2006.01)
(52) U.S. Cl.
CPC .................. *B60K 11/08* (2013.01)
(58) Field of Classification Search
CPC ........ B60K 11/08; B60K 11/085; B60K 11/00
See application file for complete search history.

(56) References Cited

U.S. PATENT DOCUMENTS

| 5,499,690 A | 3/1996 | Shearn et al. |
| 6,386,624 B1 * | 5/2002 | Schultz ................. B62D 65/04 296/193.1 |
| 6,517,146 B1 | 2/2003 | Cheron et al. |
| 7,784,576 B2 | 8/2010 | Guilfoyle et al. |

(Continued)

FOREIGN PATENT DOCUMENTS

| CN | 101844549 A | 9/2010 |
| CN | 102267491 A | 12/2011 |

(Continued)

OTHER PUBLICATIONS

The translation of WO 2009121446 A1 which the office action relies upon is attached. (Year: 2009).*

(Continued)

*Primary Examiner* — James A Shriver, II
*Assistant Examiner* — Nicholas R. Kandas
(74) *Attorney, Agent, or Firm* — Withrow & Terranova, PLLC

(57) ABSTRACT

A front closing cross-member includes a medial portion having an airfoil-like shape arranged between left and right end portions of greater height than the medial portion. The medial portion includes a trailing edge having a height less than a height of a leading edge thereof. The end portions are configured to be mounted to at least a portion of a chassis frame of a road vehicle. The cross-member may exhibit the same or greater stiffness and torsional rigidity as a conventional member, while exhibiting reduced drag and facilitating formation of a laminar airflow wake.

16 Claims, 9 Drawing Sheets

(56) References Cited

U.S. PATENT DOCUMENTS

| | | | |
|---|---|---|---|
| 8,167,068 B2 | 5/2012 | Riviere | |
| 8,191,959 B2 * | 6/2012 | Ritz | B62D 25/084 296/193.09 |
| 9,162,714 B2 | 10/2015 | Maier et al. | |
| 10,823,209 B2 * | 11/2020 | Shen | H02G 3/32 |
| 2005/0062251 A1 * | 3/2005 | Ramsey | B60G 21/051 280/124.153 |
| 2010/0060039 A1 | 3/2010 | Riviere | |
| 2014/0284966 A1 | 9/2014 | Maier et al. | |
| 2017/0326969 A1 * | 11/2017 | Ayala | B60R 19/52 |

FOREIGN PATENT DOCUMENTS

| | | |
|---|---|---|
| CN | 203713971 U | 7/2014 |
| CN | 107009996 A | 8/2017 |
| CN | 107792188 A | 3/2018 |
| CN | 207374298 U | 5/2018 |
| CN | 108275205 A | 7/2018 |
| DE | 102006040073 A1 | 2/2008 |
| EA | 201401095 A1 | 4/2016 |
| EP | 1216872 A1 | 6/2002 |
| EP | 2222489 A2 | 9/2010 |
| JP | 2005255070 A | 9/2005 |
| WO | 2009121446 A1 | 10/2009 |
| WO | WO 2009121446 A1 * | 10/2009 |
| WO | WO-2009121446 A1 * | 10/2009 ............. B62D 21/02 |
| WO | 2011142694 A1 | 11/2011 |

OTHER PUBLICATIONS

International Search Report and Written Opinion for International Patent Application No. PCT/US2019/037921, mailed Aug. 29, 2019, 8 pages.

Examination Report for European Patent Application No. 19934225.4, mailed Nov. 3, 2022, 4 pages.

Supplementary European Search Report for European Patent Application No. 19934225.4, mailed Feb. 25, 2022, 4 pages.

Examination Report for European Patent Application No. 19934225.4, mailed Mar. 10, 2022, 5 pages.

Notification to Grant for Chinese Patent Application No. 201980096525.0, mailed Dec. 3, 2023, 7 pages.

* cited by examiner

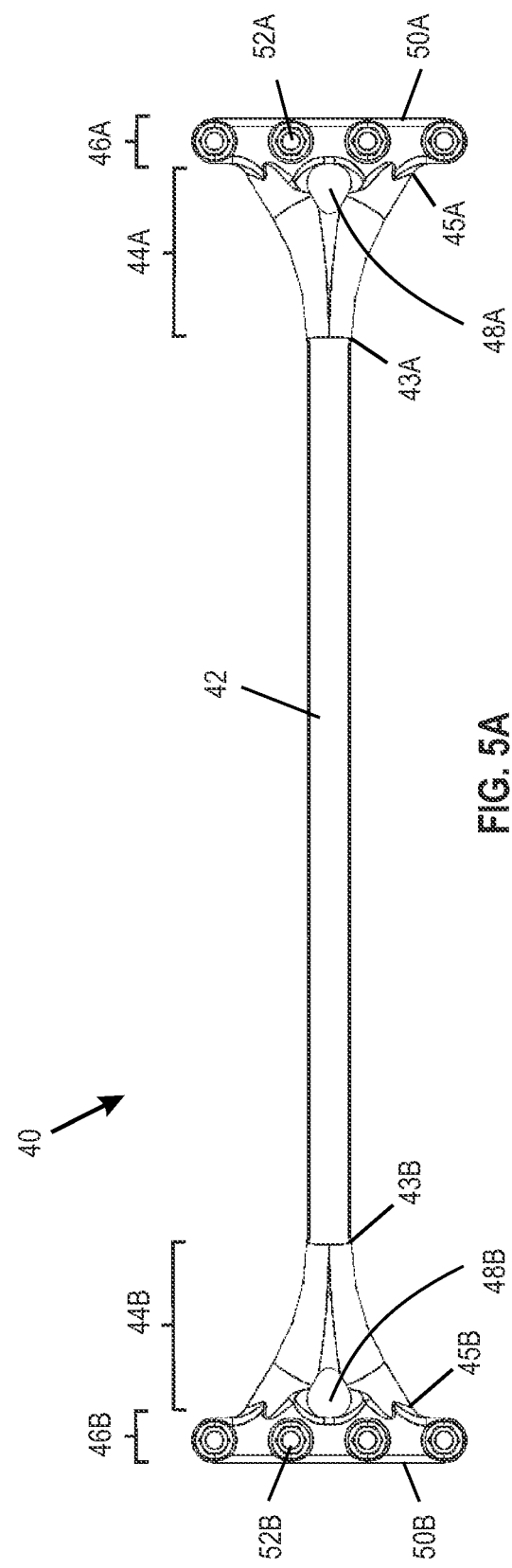

AERODYNAMIC FRONT CLOSING CROSS-MEMBER FOR ROAD VEHICLE

CROSS-REFERENCE TO RELATED APPLICATION(S)

This application is the U.S. national phase under 35 U.S.C. § 371 of International Application No. PCT/US2019/037921 filed on Jun. 19, 2019, wherein the entire contents of the foregoing application are hereby incorporated by reference herein.

FIELD OF THE DISCLOSURE

The disclosure relates generally to frame members that make up a chassis frame, also referred to as a chassis frame ladder, of road vehicles such as trucks. In particular aspects, the disclosure relates to a front closing cross-member configured to improve aerodynamic performance and provide enhanced flow of air to the cooling package (e.g., radiator) of a road vehicle.

BACKGROUND

The cost of fuel is typically the largest cost associated with operating a tractor trailer. A tractor trailer in regular full-time operation may use 20,000 gallons or more of diesel fuel per year. Fuel costs are similarly high for bus vehicles. Even small improvements in fuel efficiency can have a significant impact on aggregate fuel costs for operators of truck, tractor, or bus vehicles. Decreases in fuel consumption would also lead to concomitant reductions in emissions such as NOx, SOx, particulates, and unburned hydrocarbons.

Increasing combustion pressure in engines and development of exhaust treatment systems often require increased cooling capacity; however, aerodynamic efficiency is typically promoted by reducing the size of airflow openings at the front of a tractor trailer.

FIG. 1A is a front elevational view of a front exterior of a tractor 10 of a tractor trailer, showing left and right fenders 12A, 12B that are laterally arranged relative to a hood 14 that serves as a cover for an engine of the tractor. The hood 14 and fenders 12A, 12B may be part of a unitary fairing configured to tilt forward to permit access to the tractor engine for servicing. As shown, the left and right fenders 12A, 12B increase in width, and a remainder of the hood 14 decreases in width, with increasing proximity to a front end 16 of the tractor 10. A primary front opening 18 is arranged below a forward end of the hood 14 and between the fenders 12A, 12B, and permits ingress of air into an engine compartment for thermal interaction with one or more heat exchangers such as a front radiator. As shown, a conventional front closing cross-member 20 is arranged within the primary front opening 18. The front closing cross-member 20 has a ladder-like shape, with a generally rectangular perimeter and several apertures 22 defined therein to permit the passage of air. FIG. 1B is a front elevational view of a portion of FIG. 1A, showing an exposed portion of the front closing cross-member 20 (including apertures 22 defined therein) within the primary front opening 18.

A front closing cross-member is an integral part of a chassis frame (also referred to as a chassis frame ladder) of the truck portion of a tractor trailer. A front closing cross-member sets the front width of the chassis frame ladder, provides structural rigidity at the front end of the tractor, and is critical in promoting proper chassis and hood alignment.

FIG. 2A is a rear perspective view of the front closing cross-member 20 of FIGS. 1A-1B attached to left and right multi-function brackets (MFBs) 24A, 24B that embody forward portions of a tractor frame. As used herein, the terms "left," "right," "forward," and so on, are used in a manner relative to the perception of a person present in the driver's seat of a truck, such that "left" corresponds to the driver's side, "right" corresponds to the passenger's side, etc. The MFBs 24A, 24B are used to support a hood opening mechanism, to support tow hooks, to support engine cooling components, and to provide corner interfaces between longitudinal rails (not shown) and the front closing cross-member 20 as portions of a tractor frame. FIG. 2B is a front perspective view of the front closing cross-member 20 and MFBs 24A, 24B of FIG. 2A, with left and right longitudinal rails 26A, 26B fastened to the left and right MFBs 24A, 24B, respectively. As shown, the front closing cross-member 20 is secured to the MFBs 24A, 24B with left and right groups of longitudinal bolts 28A, 28B, and the left and right longitudinal rails 26A, 26B are secured to the MFBs 24A, 24B with left and right groups of transverse bolts 29A, 29B, respectively.

FIG. 3 is a side cross-sectional schematic view of an engine compartment 34 of a tractor (i.e., of a tractor-trailer) incorporating the front closing cross-member 20 of FIGS. 1A-1B and 2A-2B positioned in a primary front opening 18 of the tractor. The primary front opening 18 is defined between bounding members 30, 30' (optionally part of a front fairing). As shown, the front closing cross-member 20 is positioned forward of a front radiator 31, which is arranged forward of an engine 32 within the engine compartment 34. Horizontal arrows show the direction of airflow through the primary front opening 18, as well as past the front closing cross-member 20 and through apertures 22 defined therein, to impinge on the front radiator 31. Unfortunately, the shape of the conventional front closing cross-member 20 provides significant aerodynamic drag and causes a turbulent airflow wake downstream of the front closing cross-member 20 when the tractor is traveling at highway speeds. FIG. 4 is a side cross-sectional view of a portion of the front closing cross-member 20 of FIG. 3 (with an aperture 22 defined therein), with superimposed streamlines showing a turbulent airflow wake 36 downstream of the front closing cross-member 20. This turbulent airflow wake 36 results in localized low pressure regions along a face of the front radiator (element 31 shown in FIG. 3), which detrimentally limits transfer of heat between the air and the front radiator 31.

A need therefore exists in the art for improved front closing cross-members and road vehicles incorporating the same, to address limitations associated with conventional front closing cross-members.

SUMMARY

Aspects of the disclosure relate to a front closing cross-member including a medial portion having an airfoil-like shape arranged between left and right end portions of greater height than the medial portion. The medial portion includes a trailing edge having a height less than a height of a leading edge thereof. The left and right end portions are configured to be mounted to at least a portion of a structural frame of the road vehicle (e.g., by using fasteners extending through multiple apertures defined in the end portions). The novel front closing cross-member may exhibit the same or greater stiffness and torsional rigidity as a conventional front closing cross-member, while exhibiting reduced drag and facilitating formation of a laminar airflow wake to permit improved cooling of a front radiator positioned downstream of the front closing cross-member.

One aspect of the present disclosure provides a front closing cross-member for a road vehicle. The front closing cross-member comprises left and right portions, and a medial portion having a leading edge, a trailing edge, and an airfoil-like cross-sectional shape. The trailing edge has a height less than a height of the leading edge, and the medial portion is arranged between the left and right end portions. Each of the left and right end portions has a height greater than a maximum height of the medial portion, and each of the left and right end portions is configured to be mounted to at least a portion of a structural frame of the road vehicle.

In certain embodiments, the front closing cross-member comprises a left transition portion arranged between the left end portion and the medial portion, and a right transition portion is arranged between the right end portion and the medial portion. The left transition portion comprises a height that increases from a medial end thereof (i.e., proximate to the medial portion) to a lateral end thereof (proximate to the left end portion) to provide a height transition between the medial portion and the left end portion. The right transition portion comprises a height that increases from a medial end thereof (i.e., proximate to the medial portion) to a lateral end thereof (proximate to the right end portion) to provide a height transition between the medial portion and the right end portion.

In certain embodiments, a left opening is defined between a portion of the left transition portion and the left end portion, and a right opening is defined between a portion of the right transition portion and the right end portion.

In certain embodiments, the medial portion, the left and right end portions, and the left and right transition portions comprise a single unitary element. In certain embodiments, the medial portion, the left and right end portions, and the left and right transition portions comprise a single casting of metal or metal alloy.

In certain embodiments, the medial portion comprises a first average thickness extending in a front-to-rear direction; each of the left end portion and the right end portion comprises a second average thickness extending in the front-to-rear direction; and the first average thickness is greater than the second average thickness.

In certain embodiments, the medial portion comprises a first average thickness extending in a front-to-rear direction; each of the left end portion and the right end portion comprises a second average thickness extending in the front-to-rear direction; each of the left transition portion and the right transition portion comprises a third average thickness extending in the front-to-rear direction; the first average thickness is greater than the second average thickness; and the third average thickness is between the first average thickness and the second average thickness.

In certain embodiments, the medial portion comprises an arcuate shape when viewed from above, with a front surface at a center of the medial portion arranged forward of the front surface at ends of the medial portion.

In certain embodiments, each end portion of the left and right end portions defines a plurality of apertures, and each aperture of the plurality of apertures is configured to receive a fastener arranged to couple the end portion to the at least a portion of the structural frame of the road vehicle.

In certain embodiments, for each end portion of the left and right end portions, the plurality of apertures defines at least three (or at least four) apertures that are vertically aligned, with central axes of the apertures being parallel to one another.

In certain embodiments, a plurality of wiring harness mounting regions arranged along or proximate to the trailing edge of the medial portion.

In certain embodiments, the leading edge comprises a first curved surface, the trailing edge comprises a second curved surface, the medial portion comprises a generally symmetric airfoil shape that provides a zero degree angle of attack relative to a horizontal plane when the front closing cross-member is mounted to a truck frame and exposed to an oncoming airflow in a horizontal direction.

In another aspect, the disclosure relates to a front closing cross-member for a road vehicle, the front closing cross-member comprising left and right end portions, left and right transition portions, and a medial portion having a leading edge, a trailing edge, and an airfoil-like cross sectional shape with the trailing edge having a height less than a height of the leading edge. The left and right end portions are configured to be mounted to at least a portion of a structural frame of the road vehicle. The left transition portion is arranged between the left end portion and the medial portion, and the right transition portion is arranged between the right end portion and the medial portion. The left and right end portions each have a height greater than a maximum height of the medial portion. The left transition portion provides a height transition between the medial portion and the left end portion, and the right transition portion provides a height transition between the medial portion and the right end portion. The medial portion comprises a first average thickness extending in a front-to-rear direction, and the left and right end portions each comprise a second average thickness extending in the front-to-rear direction; with the first average thickness being greater than the second average thickness.

In certain embodiments, a left opening is defined between a portion of the left transition portion and the left end portion, a right opening is defined between a portion of the right transition portion and the right end portion. Additionally, each end portion of the left and right end portions defines a plurality of apertures, each aperture of the plurality of apertures is configured to receive a fastener arranged to couple the end portion to the at least a portion of the structural frame of the road vehicle, and for each end portion of the left and right end portions, the plurality of apertures defines at least three apertures (or at least four apertures) that are vertically aligned, with central axes of the apertures being parallel to one another.

In certain embodiments, a road vehicle frame comprises a front closing cross-member as disclosed herein attached to first and second multi-function brackets of the road vehicle. Such brackets multi-function brackets may be further attached to left and right longitudinal rails of a frame of the road vehicle.

In certain embodiments, a road vehicle comprises an engine, a radiator, and a front closing cross-member as disclosed herein, wherein the radiator is positioned forward of the engine, and the front closing cross-member is positioned forward of the radiator.

In another aspect, any one or more aspects or features described herein may be combined with any one or more other aspects or features for additional advantage.

Other aspects and embodiments will be apparent from the detailed description and accompanying drawings.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 5A is a front elevational view of a front closing cross-member according to one embodiment of the present disclosure.

Figure 8A:
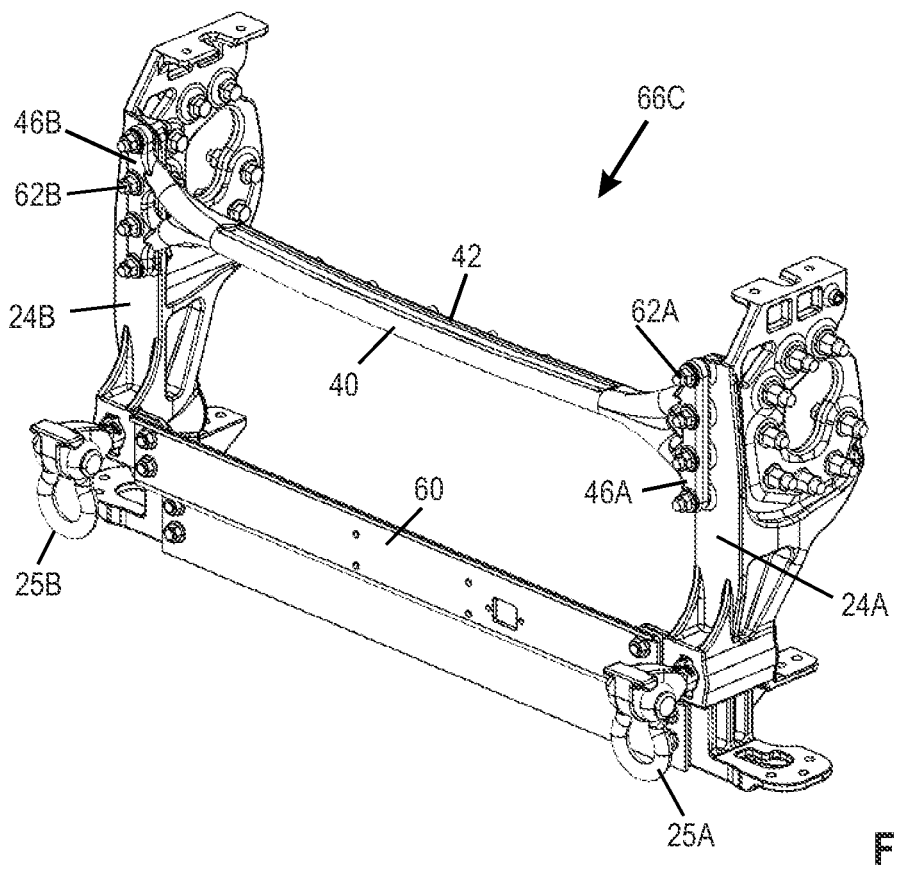
Figure 8B:
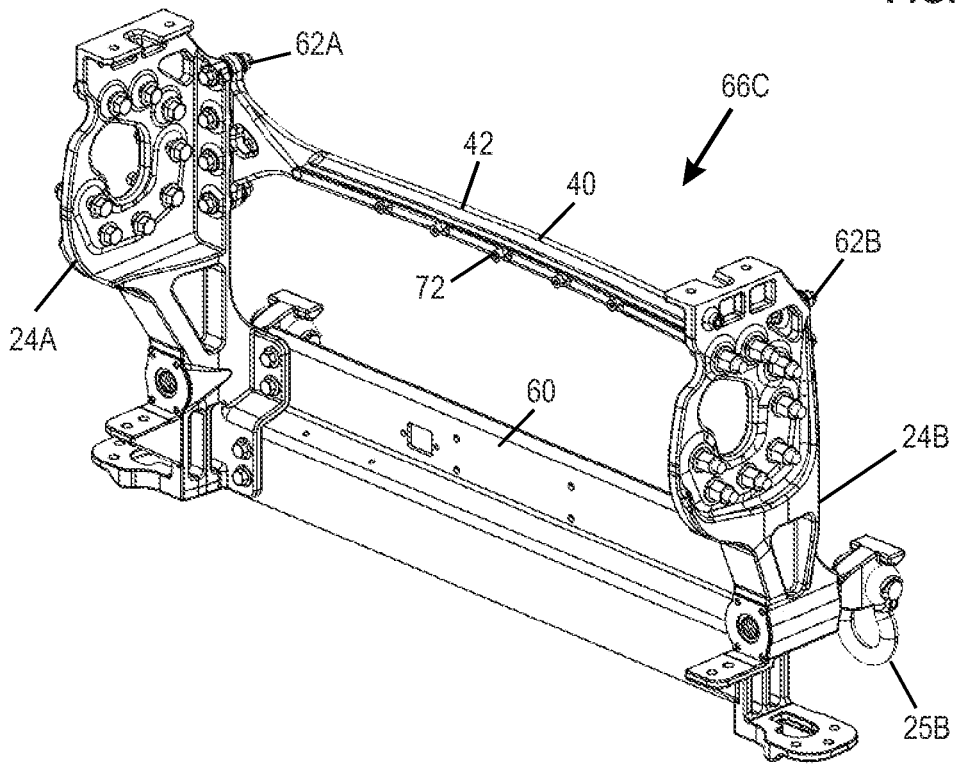

FIGS. 8A and 8B provide front and rear elevational views, respectively, of a portion of a second road vehicle frame including the front closing cross-member of FIGS. 5A-5D and a lower cross-member both spanning between left and right multi-function brackets, with each multi-function bracket including a tow hook.

Figure 9:
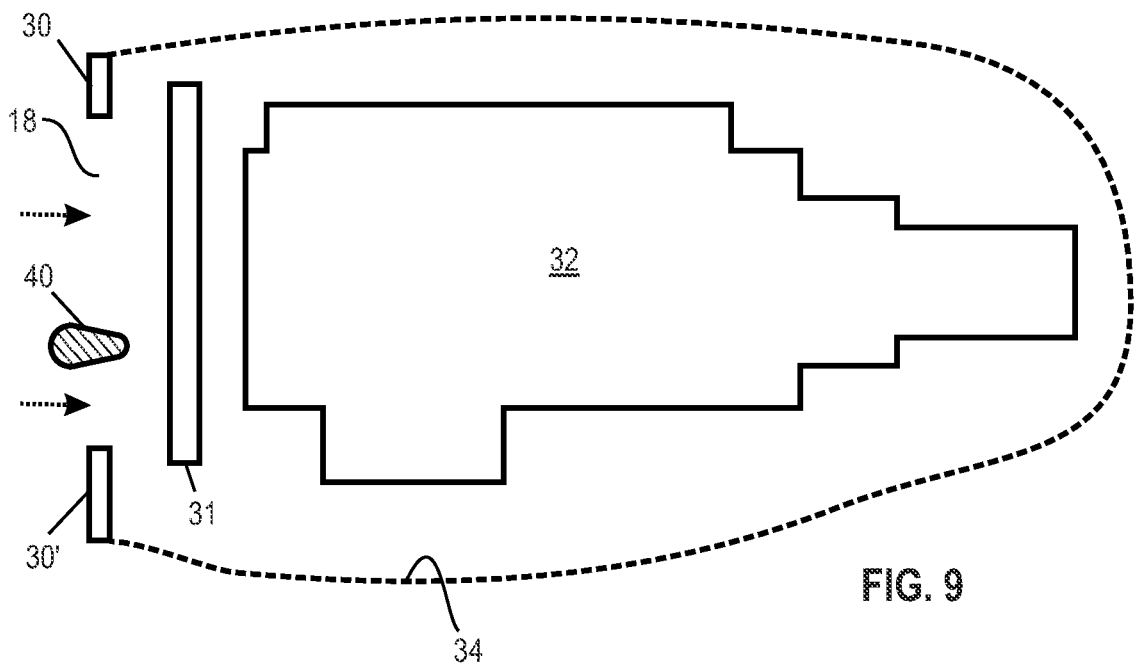

FIG. 9 is a side cross-sectional schematic view of an engine compartment of a tractor of a tractor-trailer incorporating the front closing cross-member of FIGS. 5A-5D positioned in a primary front opening of the tractor.

Figure 10:
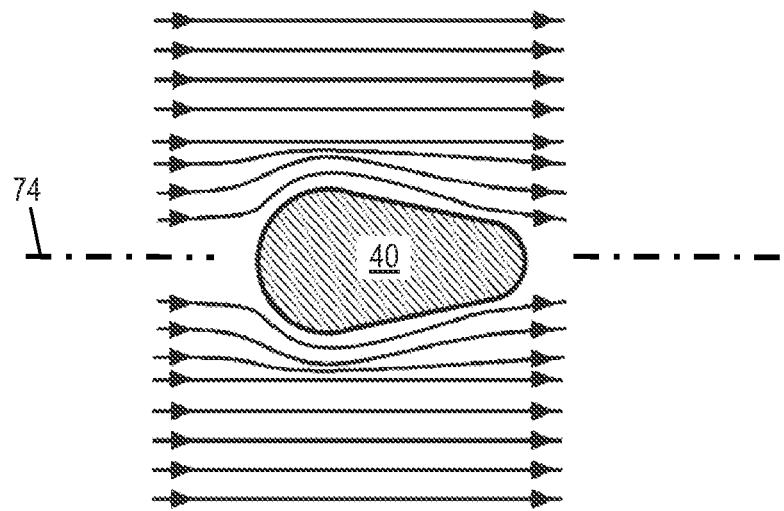

FIG. 10 is a side cross-sectional view of a portion of the front closing cross-member of FIGS. 5A-5D, with superimposed streamlines showing a laminar airflow wake downstream of the front closing cross-member.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The present disclosure relate to a front closing cross-member including a medial portion having an airfoil-like shape arranged between left and right end portions of greater height than the medial portion. The medial portion includes a trailing edge having a height less than a height of a leading edge thereof. The left and right end portions of increased height relative to the medial portion are configured to be mounted to at least a portion of a structural frame of the road vehicle. The front closing cross-member may exhibit the same or greater stiffness and torsional rigidity as a conventional front closing cross-member, while exhibiting reduced drag and facilitating formation of a laminar airflow wake. Such an airflow wake may avoid formation of low pressure regions inherent to turbulent airflow wakes, and permit improved cooling of a front radiator positioned downstream of the novel front closing cross-member, relative to use of a conventional front closing cross-member as described in the background portion of the present disclosure.

Details of illustrative embodiments are described hereinafter. As noted previously, the terms "left," "right," "forward," and so on, are used herein in a manner relative to the perception of a person present in the driver's seat of a truck, such that "left" corresponds to the driver's side, "right" corresponds to the passenger's side, etc.

Figure 1A:
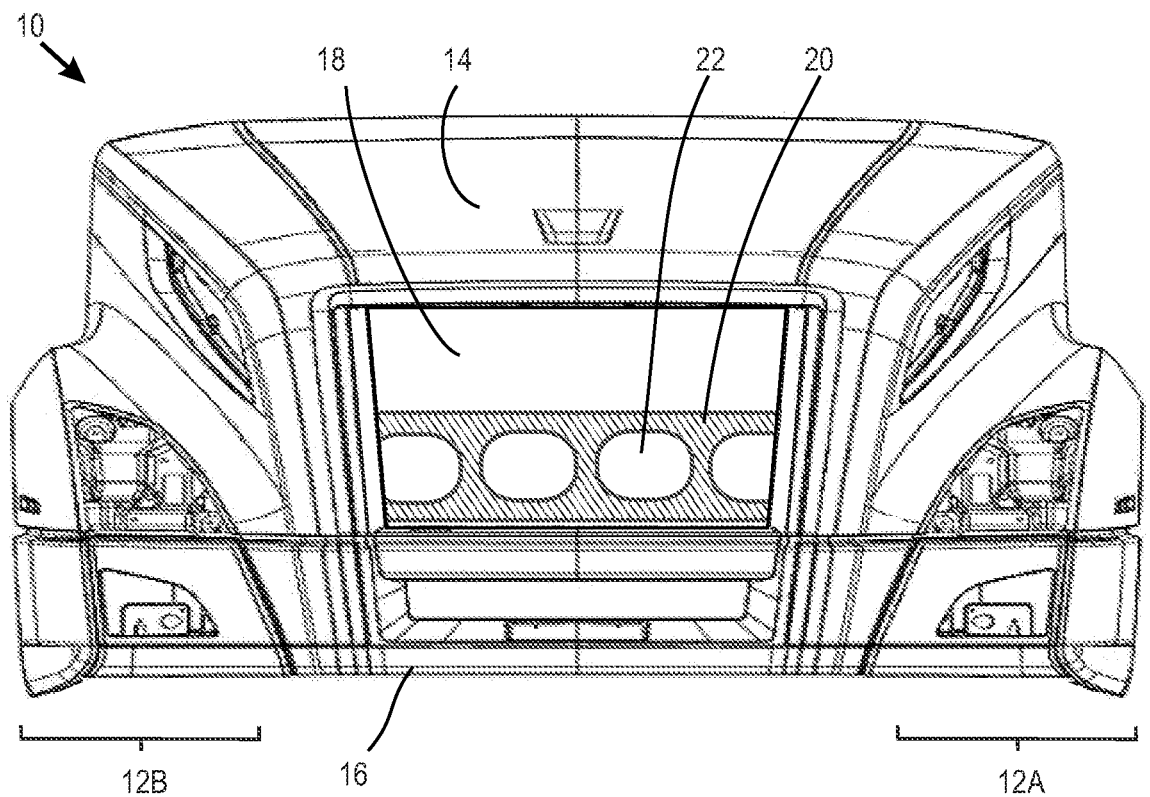
FIG. 1A is a front elevational view of a front exterior portion of a tractor portion of a tractor trailer, showing a conventional front closing cross-member arranged within a primary front opening.
Figure 1B:
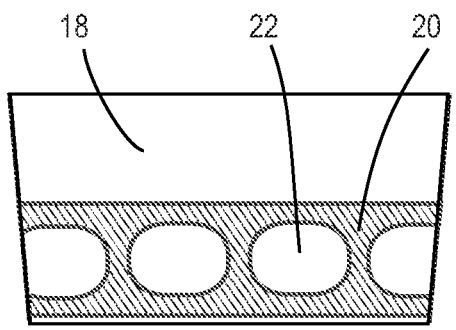
FIG. 1B is a front elevational view of a portion of FIG. 1A, showing an exposed portion of the front closing cross-member within the primary front opening.
Figure 2A:
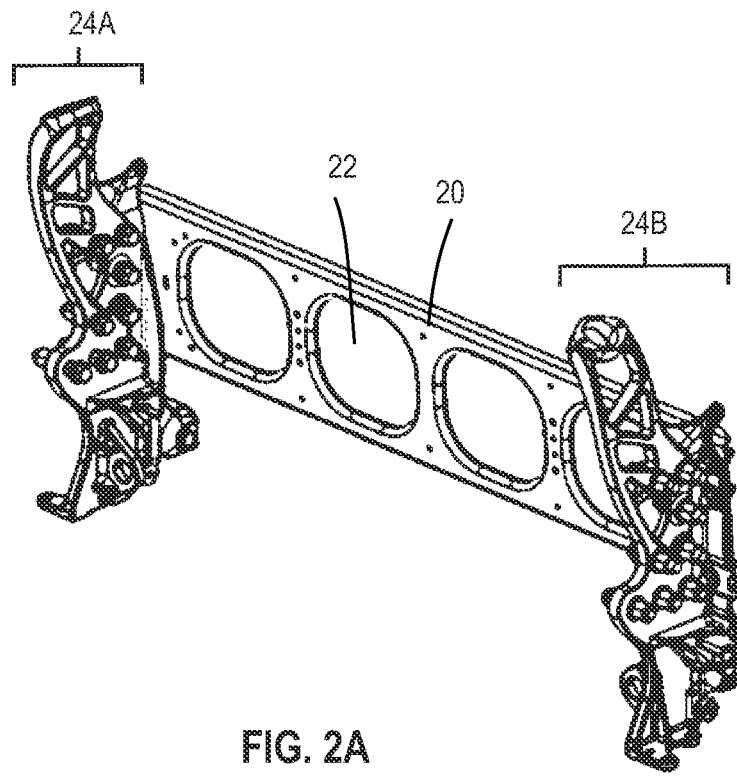
FIG. 2A is a rear perspective view of the front closing cross-member of FIGS. 1A-1B attached to left and right multi-function brackets (MFBs) that embody forward portions of a tractor frame.
Figure 2B:
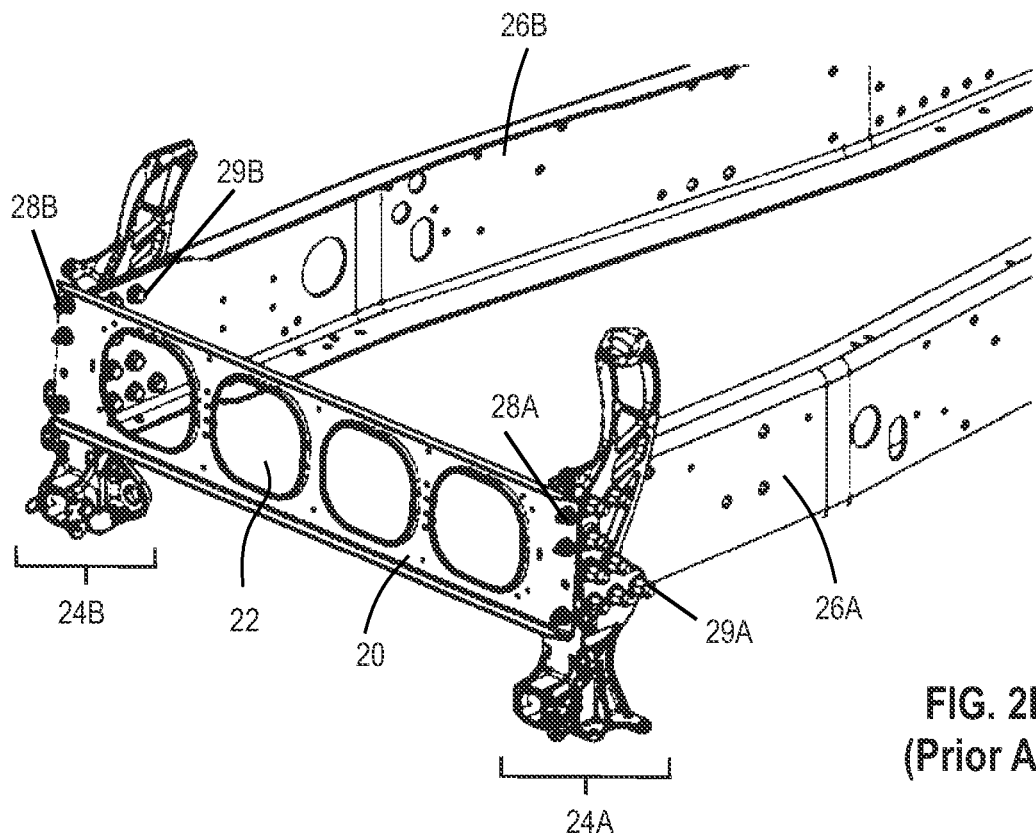
FIG. 2B is a front perspective view of the front closing cross-member and MFBs of FIG. 2A, with left and right longitudinal rails received by the left and right MFBs, respectively.
Figure 3:
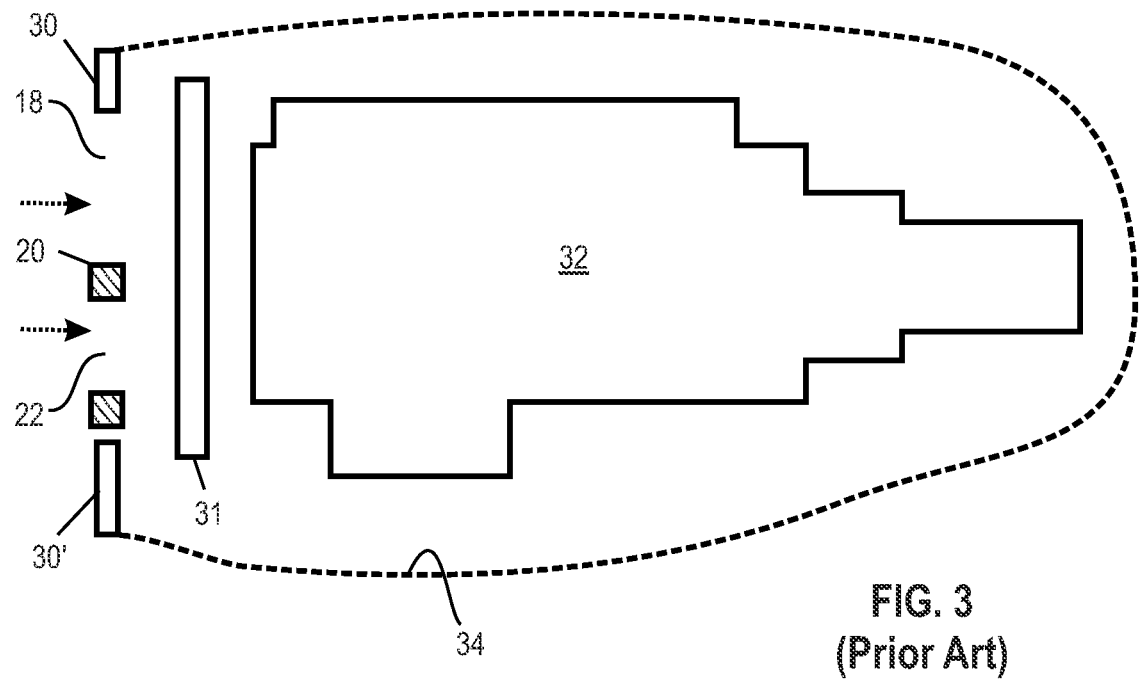
FIG. 3 is a side cross-sectional schematic view of an engine compartment of a tractor of a tractor-trailer incorporating the front closing cross-member of FIGS. 1A-1B and 2A-2B positioned in a primary front opening of the tractor.
Figure 4:
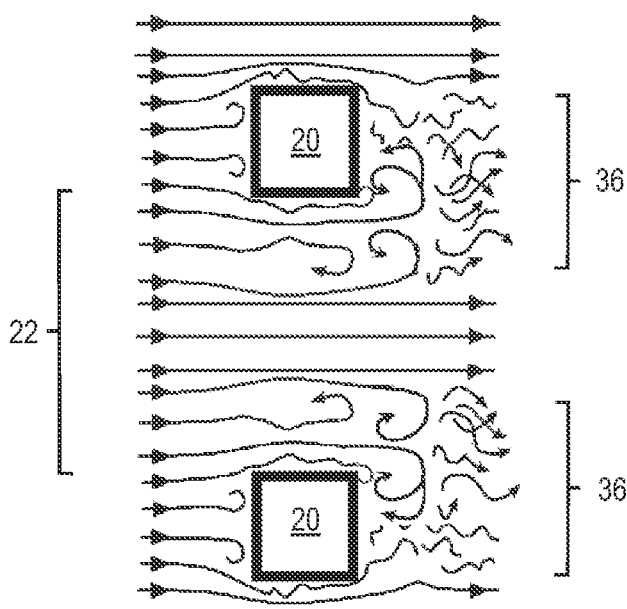
FIG. 4 is a side cross-sectional view of a portion of the front closing cross-member of FIG. 3, with superimposed streamlines showing a turbulent airflow wake downstream of the front closing cross-member.
Figure 5B:
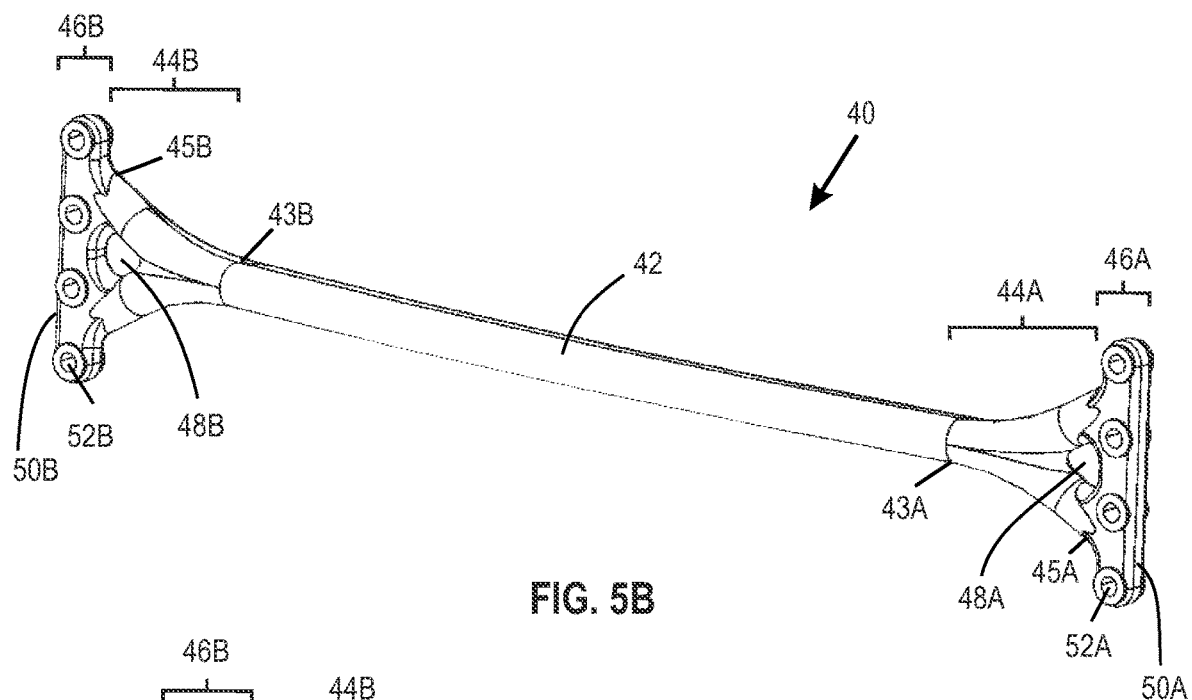
FIG. 5B is a front perspective view of the front closing cross-member of FIG. 5A.

FIG. 5A is a front elevational view of a front closing cross-member 40 according to one embodiment of the present disclosure. Additional views (i.e., a front perspective view, a magnified portion of the front perspective view, and a cross-sectional view) of the front closing cross-member 40 are provided in FIGS. 5B-5D. Referring to FIG. 5A, the front closing cross-member 40 includes a medial portion 42 arranged between left and right end portions 46A, 46B, with left and right transition portions 44A, 44B being provided between the medial portion 42 and the left and right end portions 46A, 46B, respectively. The left and right transition portions 44A, 44B each have a generally triangular shape. The front closing cross-member 40 further includes left and right ends 50A, 50B. As shown, each of the left and right end portions 46A, 46B has a height that is substantially greater (e.g., at least about three times, about four times, or about five times greater in certain embodiments) than a height of the medial portion 42. The left transition portion 44A has a height that increases from a medial end 43A to a lateral end 45A of the left transition portion 44A to provide a height transition between the medial portion 42 and the left end portion 46A. Similarly, the right transition portion 44B has a height that increases from a medial end 43B to a lateral end 45B of the right transition portion 44B to provide a height transition between the medial portion 42 and the right end portion 46B. A left opening 48A is defined between a portion of the left transition portion 44A and the left end portion 46A, and a right opening 48B is defined between a portion of the right transition portion 44B and the right end portion 46B, wherein the left and right openings 48A, 48B are provided to reduce aerodynamic drag and weight of the front closing cross-member 40. The left and right end portions 46A, 46B each have a rounded, generally rectangular shape and each defines four vertically aligned apertures 52A, 52B that are configured to permit insertion of fasteners (e.g., bolts, not shown) in a longitudinal direction for attachment of the end portions 46A, 46B of the front closing cross-member 40 to at least one portion of a vehicular frame (such as left and right multi-function brackets (MFBs) thereof, as shown hereinafter in connection with FIGS. 6-8B). With each group of vertically aligned apertures 52A, 52B, the respective apertures have central axes that are parallel to one another.

Figure 5C:
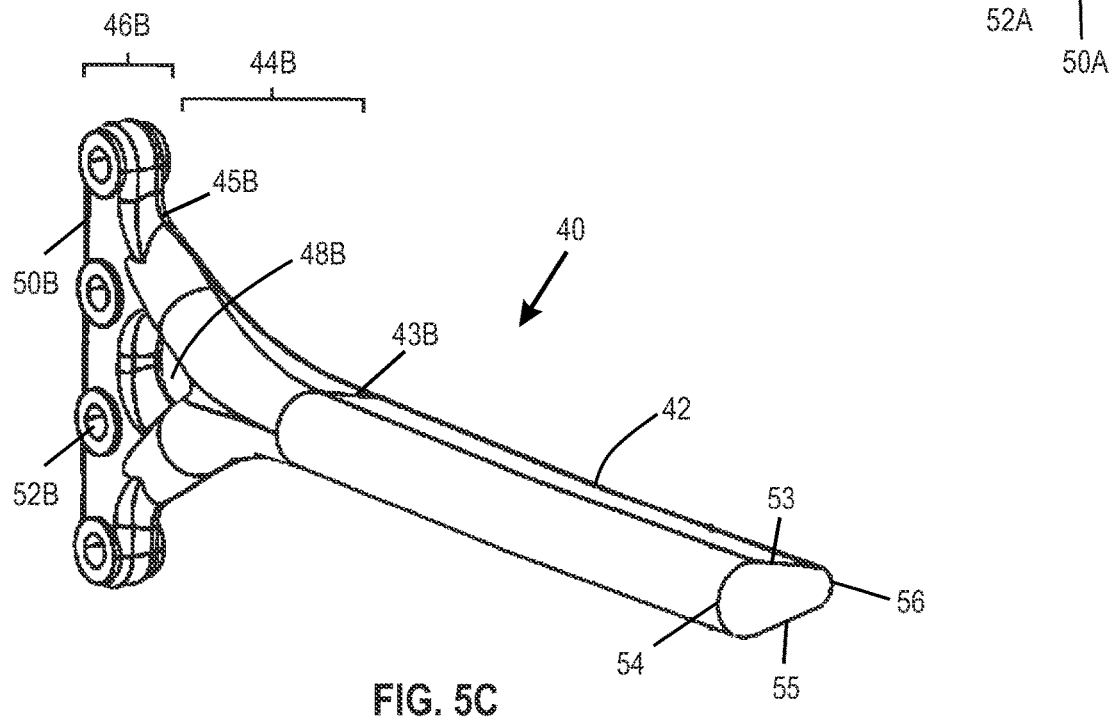
FIG. 5C is a magnified front perspective view of part of the front closing cross-member of FIGS. 5A-5B, including a cross-sectional view of the medial portion.
Figure 5D:
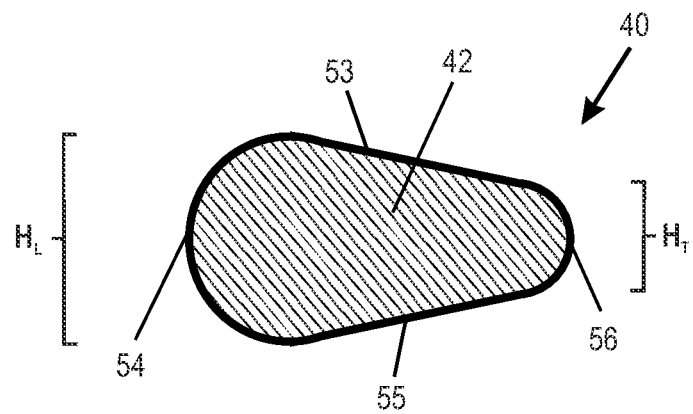
FIG. 5D is a cross-sectional view of the medial portion of the front closing cross-member of FIGS. 5A-5C.

FIG. 5B is a front perspective view of the front closing cross-member 40, and FIG. 5C is a magnified front perspective view of part of the front closing cross-member 40, including a cross-sectional view of the medial portion 42. As shown in FIGS. 5C and 5D, each transition portion 44A, 44B has a thickness in a front-to-rear direction that is reduced with proximity to the end portions 46A, 46B. Additionally, the medial portion 42 has an average thickness in a front-to-rear direction that is greater than an average thickness of the transition portions 44A, 44B, and an average thickness of the transition portions 44A, 44B is greater than an average thickness of the end portions 46A, 46B. As further shown in FIGS. 5C and 5D, the medial portion 42 includes a curved leading edge 54 and a curved trailing edge 56, with a downwardly sloping upper surface 53 and an upwardly sloping lower surface 55 extending therebetween. The end portions 46A, 46B each define four vertically aligned apertures 52A, 52B, which are substantially equally spaced and extend through the respective end portions 46A, 46B in a longitudinal direction.

FIG. 5D is a cross-sectional view of the medial portion 42 of the front closing cross-member 40 of FIGS. 5A-5C. As noted previously, the medial portion 42 includes a curved leading edge 54 and a curved trailing edge 56, with a downwardly sloping upper surface 53 and an upwardly sloping lower surface 55 extending therebetween. The curved leading edge 54 has a height $H_L$ that is greater (e.g., at least 30% greater, 50% greater, 70% greater, 85% greater, or 100% greater in certain embodiments) than a height of the curved trailing edge $H_T$. In certain embodiments, the medial portion 42 is generally symmetric relative to a horizontal plane (not shown).

In certain embodiments, a front closing cross-member as disclosed herein (i.e., including a medial portion, transition portions, and end portions thereof according to the front closing cross-member 40 of FIGS. 5A-5D) may embody a unitary single member. Various fabrication techniques that may be used including one or more of casting, machining, forging, welding, additive material deposition, and/or subtractive material removal. In certain embodiments, a front closing cross-member may be fabricated of a metal or metal alloy (including but not limited to spheroidal graphite cast iron (also known as ductile iron), aluminum, steel, alloy steel, or the like). Ductile iron is a type of cast iron known for its impact and fatigue resistance, elongation, and wear resistance due to the spherical (round) graphite structures in the metal.

In certain embodiments, a front closing cross-member as disclosed herein may be produced by lost foam casting. A lost foam casting is created by a type of evaporative-pattern casting process where a polystyrene foam pattern is used to form a mold. The foam pattern is coated and embedded with a ceramic bead medium compacted around it to support the external form of the foam. Other casting techniques (e.g., green sand casting) may be used in certain embodiments, but lost foam casting is preferable to provide higher resolution features, tighter dimensional tolerances, and smoother surface finishes that may reduce or eliminate the need for post-casting finishing steps (e.g., machining). In certain embodiments, various portions of a front closing cross-member may be separately produced (e.g., cast) and joined together by welding or other means to form a final product.

Figure 6:
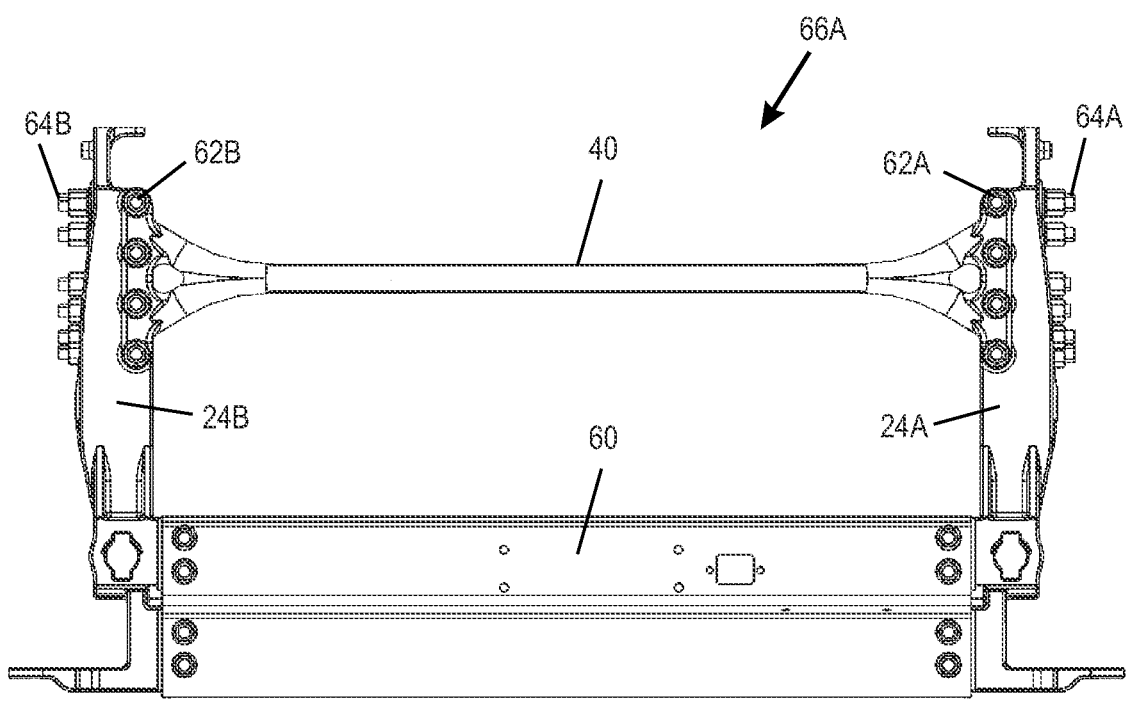
FIG. 6 is a front elevational view of a portion of a first road vehicle frame including the front closing cross-member of FIGS. 5A-5D and a lower cross-member both spanning between left and right multi-function brackets.

FIG. 6 is a front elevational view of a portion of a first road vehicle frame 66A including the front closing cross-member 40 of FIGS. 5A-5D and a lower cross-member 60 both spanning between left and right multi-function brackets 24A, 24B. Unlike the front closing cross-member 40, the lower cross-member 60 is generally rectangular in shape without exhibiting an aerodynamic profile, but little utility would be gained by reshaping the lower cross-member 60 since it is arranged behind a front bumper or fairing of the tractor without being directly exposed to a flow of incoming air when the tractor is traveling in a forward direction. The front closing cross-member 40 is secured to the MFBs 24A, 24B with left and right groups of longitudinal bolts 62A, 62B that extend through end portions 46A, 46B of the front closing cross-member 40. Left and right groups of transverse bolts 64A, 64B may also be provided.

Figure 7:
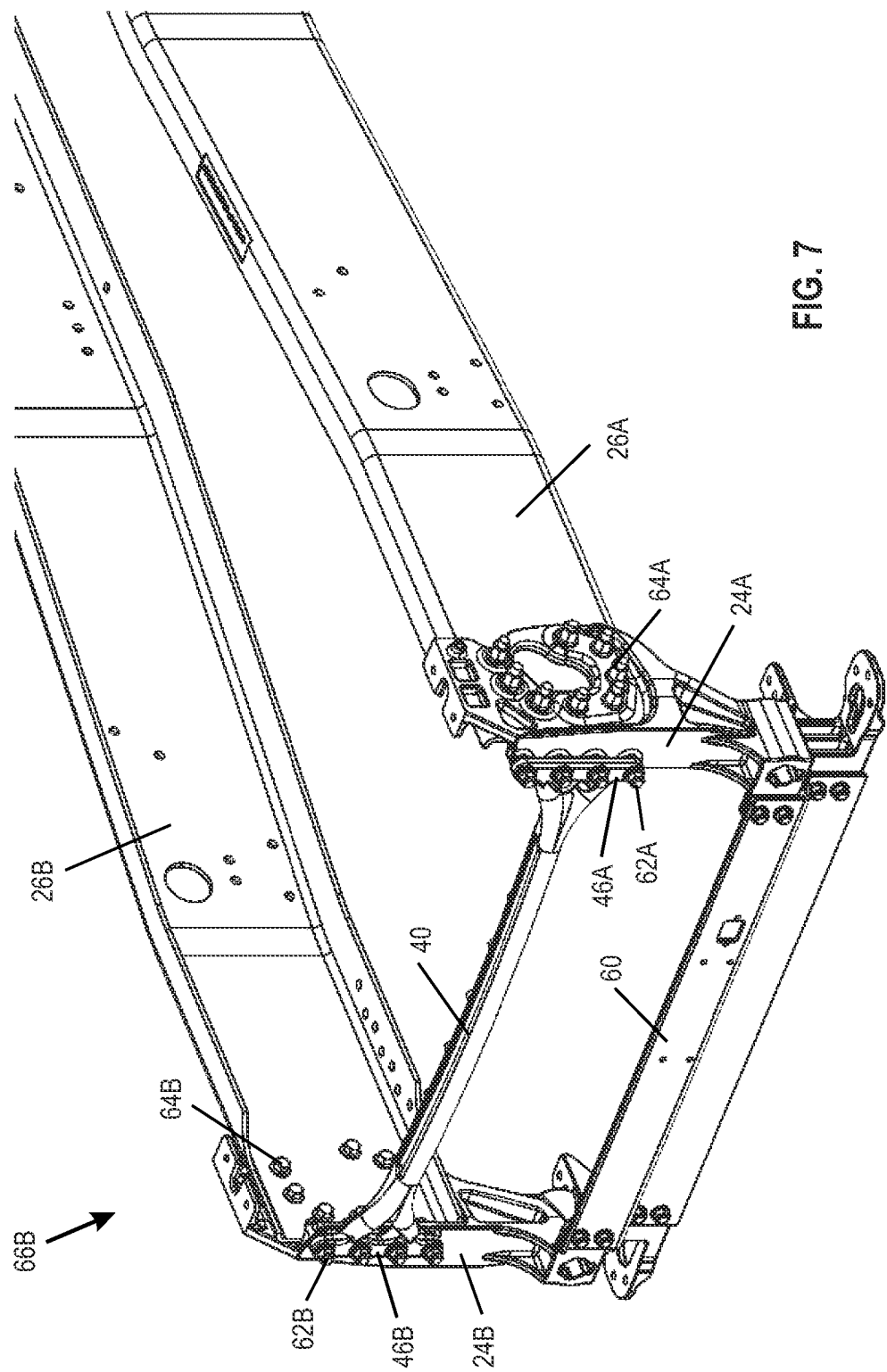
FIG. 7 is a front perspective view of the road vehicle frame portion of FIG. 6 with addition of left and right longitudinal rails affixed to the left and right multi-function brackets thereof.

FIG. 7 is a front perspective view of the road vehicle frame portion 66B of FIG. 6 with the addition of left and right longitudinal rail members 26A, 26B affixed to the left and right MFBs 24A, 24B thereof. As shown, the front closing cross-member 40 is secured to the MFBs 24A, 24B with left and right groups of longitudinal bolts 62A, 62B that extend through end portions 46A, 46B of the front closing cross-member 40. Additionally, the left and right groups of transverse bolts 64A, 64B may be used to join the MFBs 24A, 24B to the longitudinal rail members 26A, 26B.

FIGS. 8A and 8B provide front and rear elevational views, respectively, of a portion of a second road vehicle frame 66C including the front closing cross-member 40 of FIGS. 5A-5D and a lower cross-member 60 both spanning between left and right MFBs 24A, 24B, with each MFB 24A, 24B including a tow hook 25A, 25B. The front closing cross-member 40 is secured to the MFBs 24A, 24B with left and right groups of longitudinal bolts 62A, 62B that extend through end portions 46A, 46B of the front closing cross-member 40. FIGS. 8A and 8B show that the medial portion 42 of the front closing cross-member 40 may have an arcuate shape when viewed from above, with a front surface at a center of the medial portion 40 arranged forward of the end portions 46A, 46B, and arranged forward of front surfaces at distal ends of the medial portion 42. As shown in FIG. 8B, a plurality of wiring harness mounting regions 72 (e.g., holes, optionally being threaded) may be arranged along or proximate to a trailing edge of the medial portion 42, to receive fasteners for permitting wires (e.g., for sensors or other components) to be mounted along a rear of the medial portion 42.

FIG. 9 is a side cross-sectional schematic view of an engine compartment 34 of a tractor (i.e., of a tractor-trailer) incorporating the front closing cross-member 40 of FIGS. 5A-5D positioned in a primary front opening 18 of the tractor. The primary front opening 18 is defined between bounding members 30, 30' (optionally part of a front fairing). As shown, the front closing cross-member 40 is positioned forward of a front radiator 31, which is arranged forward of an engine 32 within the engine compartment 34. Horizontal arrows show the direction of airflow through the primary front opening 18, as well as past the front closing cross-member 40, to impinge on the front radiator 31.

FIG. 10 is a side cross-sectional view of a portion of the front closing cross-member 40 of FIGS. 5A-5D, with superimposed streamlines showing a laminar airflow wake downstream of the front closing cross-member 40. The front closing cross-member 40 is generally symmetrical relative to a horizontal reference line 74. As shown, superimposed streamlines show a laminar airflow wake downstream of the front closing cross-member 40, without exhibiting a turbulent wake that would lead to localized low pressure regions.

Those skilled in the art will recognize improvements and modifications to the preferred embodiments of the present disclosure. All such improvements and modifications are considered within the scope of the concepts disclosed herein and the claims that follow.

What is claimed is:

1. A front closing cross-member for a road vehicle, the front closing cross-member comprising:
   left and right end portions;
   a medial portion having a leading edge, a trailing edge that extends rearward in a longitudinal direction relative to the leading edge, and an airfoil-like cross-sectional shape, wherein the trailing edge has a height less than a height of the leading edge, and the medial portion is arranged between the left and right end portions;
   a left transition portion arranged between the left end portion and the medial portion, the left transition portion comprising a height that increases from a medial end to a lateral end of the left transition portion to provide a height transition between the medial portion and the left end portion; and
   a right transition portion arranged between the right end portion and the medial portion, the right transition portion comprising a height that increases from a medial end to a lateral end of the right transition portion to provide a height transition between the medial portion and the right end portion;
   wherein each of the left and right end portions has a height greater than a maximum height of the medial portion, each of the left and right end portions defines a plurality of apertures extending in the longitudinal direction, and each aperture is configured to receive a longitudinally extending fastener arranged to couple of the left and right end portions to at least a portion of a chassis frame ladder of the road vehicle, wherein for each end portion of the left and right end portions, the plurality of apertures defined at least three apertures that are vertically aligned, with central axes of the apertures being parallel to one another;
   wherein the front closing cross-member is fabricated of metal or metal alloy; and
   wherein the medial portion, the left and right end portions, and the left and right transition portions comprise a single casting of metal or metal alloy.

2. The front closing cross-member of claim 1, wherein a left opening is defined between a portion of the left transition portion and the left end portion, and a right opening is defined between a portion of the right transition portion and the right end portion.

3. The front closing cross-member of claim 1, wherein the medial portion, the left and right end portions, and the left and right transition portions comprise a single unitary element.

4. The front closing cross-member of claim 1, wherein:
   the medial portion comprises a first average thickness extending in the longitudinal direction;
   each of the left end portion and the right end portion comprises a second average thickness extending in the longitudinal direction; and
   the first average thickness is greater than the second average thickness.

5. The front closing cross-member of claim 1, wherein:
   the medial portion comprises a first average thickness extending in the longitudinal direction;
   each of the left end portion and the right end portion comprises a second average thickness extending in the longitudinal direction;
   each of the left transition portion and the right transition portion comprises a third average thickness extending in the longitudinal direction;
   the first average thickness is greater than the second average thickness; and
   the third average thickness is between the first average thickness and the second average thickness.

6. The front closing cross-member of claim 1, wherein the medial portion comprises an arcuate shape when viewed from above, with a front surface at a center of the medial portion arranged forward of the front surface at an end of the medial portion.

7. The front closing cross-member of claim 1, further comprising a plurality of wiring harness mounting regions arranged along or proximate to the trailing edge of the medial portion.

8. The front closing cross-member of claim 1, wherein:
the leading edge comprises a first curved surface;
the trailing edge comprises a second curved surface; and
the medial portion comprises a generally symmetric airfoil shape that provides a zero degree angle of attack relative to a horizontal plane when the front closing cross-member is mounted to the chassis frame ladder of the road vehicle and exposed to an oncoming airflow in a horizontal direction.

9. A road vehicle frame assembly comprising the front closing cross-member of claim 1 attached to first and second multi-function brackets of the chassis frame ladder of the road vehicle.

10. A road vehicle comprising an engine, a radiator, a chassis frame ladder, and the front closing cross-member of claim 1 coupled to the chassis frame ladder, wherein the radiator is positioned forward of the engine, and the front closing cross-member is positioned forward of the radiator.

11. A front closing cross-member for a road vehicle, the front closing cross-member comprising:
left and right end portions configured to be mounted to at least a portion of a chassis frame ladder of the road vehicle;
left and right transition portions; and
a medial portion having a leading edge, a trailing edge that extends rearward in a longitudinal direction relative to the leading edge, and an airfoil-like cross-sectional shape, wherein the trailing edge has a height less than a height of the leading edge;
wherein:
the left transition portion is arranged between the left end portion and the medial portion, and the right transition portion is arranged between the right end portion and the medial portion;
each of the left and right end portions has a height greater than a maximum height of the medial portion;
each of the left and right end portions defines a plurality of apertures extending in the longitudinal direction, with each aperture being configured to receive a longitudinally extending fastener arranged to couple of the left and right end portions to at least a portion of the chassis frame ladder of the road vehicle, wherein for each end portion of the left and right end portions, the plurality of apertures defined at least three apertures that are vertically aligned, with central axes of the apertures being parallel to one another;
the left transition portion comprises a height that varies with position to provide a height transition between the medial portion and the left end portion;
the right transition portion comprises a height that varies with position to provide a height transition between the medial portion and the right end portion;
the medial portion comprises a first average thickness extending in a front-to-rear the longitudinal direction;
the left and right end portions each comprise a second average thickness extending in the front-to-rear longitudinal direction; and
the first average thickness is greater than the second average thickness;
wherein the medial portion, the left and right end portions, and the left and right transition portions comprise a single casting of metal or metal alloy.

12. The front closing cross-member of claim 11, wherein:
a left opening is defined between a portion of the left transition portion and the left end portion; and
a right opening is defined between a portion of the right transition portion and the right end portion.

13. The front closing cross-member of claim 11, wherein:
the leading edge comprises a first curved surface;
the trailing edge comprises a second curved surface;
the medial portion comprises a generally symmetric airfoil shape that provides a zero degree angle of attack when exposed to an oncoming airflow in a horizontal direction.

14. A road vehicle comprising an engine, a radiator, and the front closing cross-member of claim 11, wherein the radiator is positioned forward of the engine, and the front closing cross-member is positioned forward of the radiator.

15. The front closing cross-member of claim 1, wherein the medial portion is devoid of any internal cavity.

16. The front closing cross-member of claim 11, wherein the medial portion is devoid of any internal cavity.

* * * * *